United States Patent
Kinder et al.

(10) Patent No.: US 8,521,358 B2
(45) Date of Patent: Aug. 27, 2013

(54) METHOD FOR RELEASING AN ELECTRICAL PARKING BRAKE

(75) Inventors: Ralf Kinder, Eitelborn (DE); Matthias Jumpertz, Remagen (DE); Andreas Mueller, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 301 days.

(21) Appl. No.: 12/937,814

(22) PCT Filed: Mar. 26, 2009

(86) PCT No.: PCT/EP2009/002239
§ 371 (c)(1), (2), (4) Date: Nov. 8, 2010

(87) PCT Pub. No.: WO2009/127319
PCT Pub. Date: Oct. 22, 2009

(65) Prior Publication Data
US 2011/0264346 A1    Oct. 27, 2011

(30) Foreign Application Priority Data
Apr. 15, 2008   (DE) .................. 10 2008 018 946

(51) Int. Cl.
*B60Q 11/00* (2006.01)
*B60R 16/02* (2006.01)
*G06F 19/00* (2011.01)
*B60K 28/02* (2006.01)

(52) U.S. Cl.
USPC ............... 701/36; 701/45; 701/70; 180/272; 340/438

(58) Field of Classification Search
USPC ................... 701/1, 36, 45, 48, 70, 29.1, 29.2; 180/271, 272; 307/9.1, 10.1; 340/438, 439, 340/500
See application file for complete search history.

(56) References Cited

U.S. PATENT DOCUMENTS

| | | |
|---|---|---|
| 7,407,463 B2 | 8/2008 | Kinder |
| 7,681,961 B2 | 3/2010 | Nonaga et al. |
| 2008/0190718 A1 | 8/2008 | Klusemann et al. |

FOREIGN PATENT DOCUMENTS

| | | |
|---|---|---|
| DE | 10153038 A1 | 5/2003 |
| DE | 102006029667 A1 | 1/2007 |
| DE | 102006026736 A1 | 12/2007 |
| DE | 102007004941 A1 | 7/2008 |
| WO | 2004106131 A1 | 12/2004 |
| WO | 2006013174 A1 | 2/2006 |
| WO | 2006045841 A1 | 5/2006 |

*Primary Examiner* — Thomas Tarcza
*Assistant Examiner* — Edward Pipala
(74) *Attorney, Agent, or Firm* — MacMillan, Sobanski & Todd, LLC

(57) ABSTRACT

A method for releasing an electric parking brake of a motor vehicle comprises detecting a release command and releasing the parking brake if a detected change in at least one signal precedes by maximally a predefined time interval, the change indicating capacity of a driver to act.

9 Claims, 2 Drawing Sheets

METHOD FOR RELEASING AN ELECTRICAL PARKING BRAKE

CROSS-REFERENCE TO RELATED APPLICATIONS

This application is a national stage of International Application No. PCT/EP2009/002239 filed Mar. 26, 2009, the disclosures of which are incorporated herein by reference in entirety, and which claimed priority to German Patent Application No. 10 2008 018 946.4 filed Apr. 15, 2008, the disclosures of which are incorporated herein by reference in entirety.

BACKGROUND OF THE INVENTION

The invention relates to an electric parking brake for a motor vehicle. In particular, the invention relates to a technique for safely releasing the parking brake.

In known variants of electric parking brakes, a parking braking force is either effected by means of an electromechanical element, e.g. an electric motor having a self-locking reduction gearing or, for example, is built up electrohydraulically and held by means of an electromechanical element. Electric parking brakes are usually actuated and released by a driver of the motor vehicle, by means of a switch or pushbutton. Provision of a switch or pushbutton, however, is conducive to inadvertent release of the parking brake, as a result of which accident damage can be caused. For example, the parking brake can be inadvertently released by the driver himself as he gets out of the vehicle, or also, for example, by playing children or by animals.

Various methods are known for preventing inadvertent release of a parking brake. Usually in such methods, presence of a driver of the motor vehicle is deduced from a combination of signals from the environment of the motor vehicle, and release of the parking brake is then rendered possible only if presence of the driver has been identified. Thus, DE 101 53 038 B4 proposes a control for an electric parking brake that evaluates the various signals in order to control a release of the parking brake. In addition to a signal that indicates a driver's wish to release the parking brake, the ignition of the motor vehicle must be switched on, while a service brake of the motor vehicle is active or its state is not determinable.

The invention is based on the feature of specifying a technique that provides improved protection against inadvertent release of an electric parking brake of a motor vehicle.

BRIEF SUMMARY OF THE INVENTION

According to a first aspect, a method for releasing an electric parking brake of a motor vehicle comprises the steps of detecting a release command and releasing the parking brake if a detected change in at least one signal precedes by maximally a predefined time interval, the change indicating capacity of a driver to act.

The release command can be triggered, for example, by the driver of the motor vehicle, by means of a pushbutton, a switch or another actuation device. The predefined time interval can be in the range of approximately 1-10 seconds, depending on the vehicle-related quantity assigned to the signal. In a variant, the predefined time interval is about 2-4 seconds (e.g. approximately 3 seconds).

A predefined time interval can be assigned to each of a plurality of signals. The method can include the step of releasing the parking brake when a change in at least one of the plurality of signals precedes by maximally the time interval assigned to the signal. For example, in the case of simultaneous monitoring of belt lock signals and ignition signals, a determination of a change in the ignition signal before maximally 6 seconds or, alternatively thereto, a change in a signal of a belt lock sensor at a driver's seat before maximally 2 seconds can be required for a release of the parking brake.

The at least one signal can be derived from an actuation state of an accelerator pedal, an actuation state of a clutch pedal, a level of a brake pressure of a service brake, a state of a seat occupancy sensor of a driver's seat, an ignition signal, an engaged gear stage, a locking state of a driver's seatbelt, or a vehicle speed. Further the at least one signal can also be derived from states of operating elements of the vehicle, for example those arranged for actuation by the driver in the motor vehicle, for instance in the region of a driver's door.

The method can comprise the step of detecting a change in the signal upon its exceeding or falling below an assigned threshold value. The threshold value can be selected so as to be fixed, or can be derived from a vehicle state of the motor vehicle, for example a vehicle speed or vehicle retardation.

The method can further comprise the step of detecting a change in the signal if a speed of change in the signal is above an assigned threshold value. As a result, a signal that is changing slowly, for example because of thermal effects, can be precluded from giving rise to erroneous release of the parking brake.

The method can further comprise the step of determining the expiry of the at least one predefined time interval. This can comprise, for example, comparison of a time signal with a value that is assigned to the signal and that represents the expiry of the time interval assigned to the signal.

The method can further comprise the step of setting a timing element, which signals the elapse of a time interval, to a value corresponding to the predefined time interval. A dedicated timing element and/or a dedicated value can be assigned to each signal. As long as the time interval between succeeding changes in a signal is shorter than the time interval assigned to the signal, according to a variant the timing element does not signal an elapse of the predefined time interval, and release of the parking brake can be effected upon detection of the release command.

According to a second aspect, there is provided a computer program product having program code means for executing the method described here when the computer program product runs on a processing unit (e.g. an electric control device, also termed ECU). Such a processing unit can control further brake functionalities of the motor vehicle, for example an automatic parking-brake control or an aid to stopping and starting on an inclined carriageway. The computer program product can be stored on a computer-readable data storage medium. For example, the computer program product can be stored on a portable data storage medium such as, for example, a diskette, hard disk, CD or DVD, or on a fixed data storage medium such as, for example, a semiconductor memory (for instance, a RAM, ROM, EPROM, EEPROM, NOVRAM or FLASH).

According to a third aspect, a device for releasing an electric parking brake of a motor vehicle comprises a first detection device for detecting a release command, a second detection device for detecting a change in at least one signal, the change indicating capacity of a driver to act, a time measurement device for measuring a predefined time interval, and a release device for releasing the parking brake when a detected change in the at least one signal precedes by maximally the predefined time interval, the change indicating capacity of a driver to act.

The device can be, for example, a constituent part of a parking-brake control of the motor vehicle. The first detection device can be electrically connected, for example, to a switch, pushbutton or other operating element that can be actuated by a driver. The device for measuring a predefined time interval can comprise any time measuring device, for example an analogue or digital time measuring device (clock), a backward-counting timer or a switching circuit (retriggerable monoflop).

Other advantages of this invention will become apparent to those skilled in the art from the following detailed description of the preferred embodiments, when read in light of the accompanying drawings.

Figure 1:
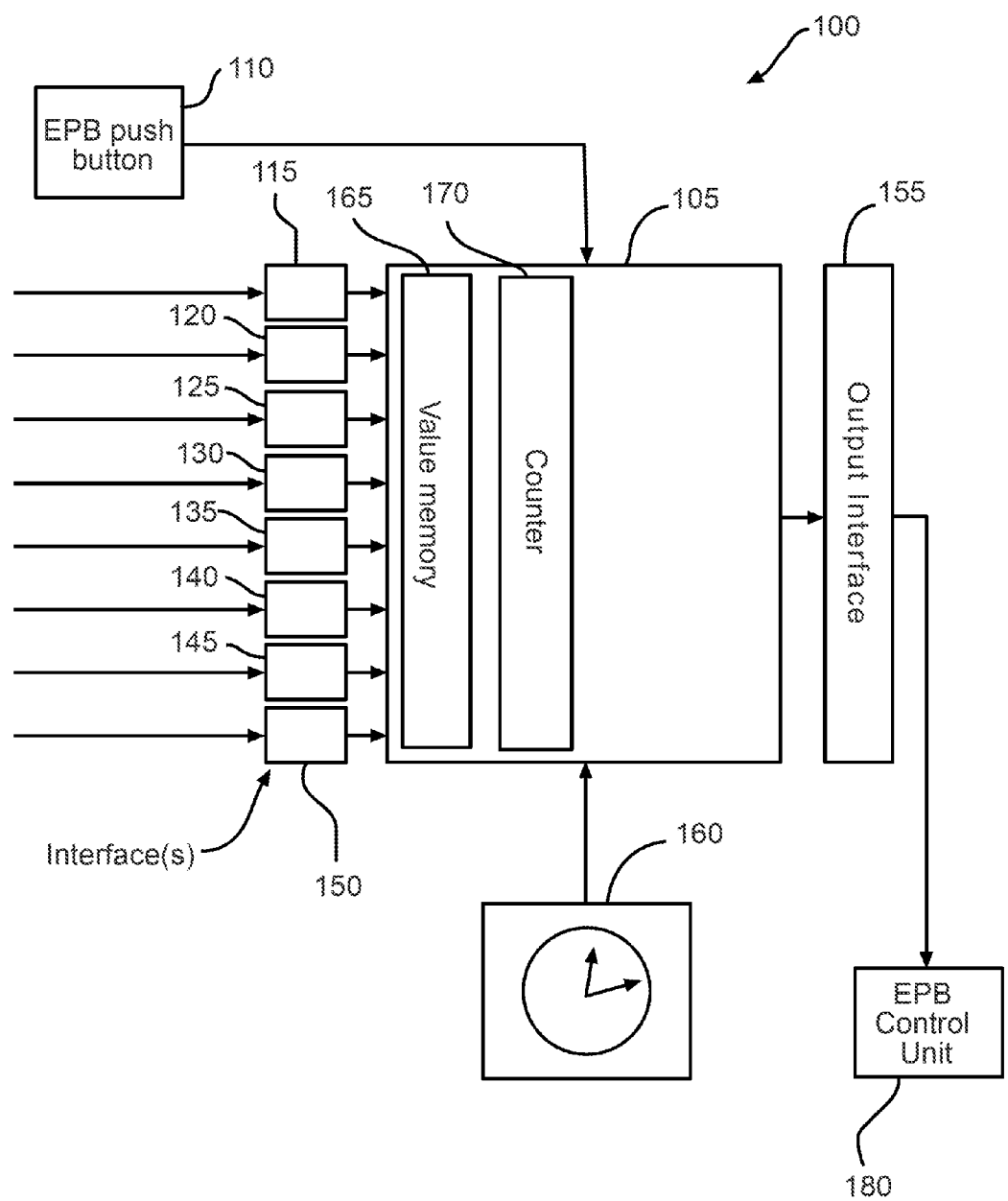
FIG. 1 shows a schematic overview of an embodiment of a device for releasing a parking brake of a motor vehicle.

Elements corresponding to one another in the drawings are denoted by corresponding references.

DETAILED DESCRIPTION OF THE INVENTION

FIG. 1 shows an overview of an embodiment of a device 100 for releasing a parking brake of a motor vehicle. The device 100 comprises a control unit 105, a pushbutton 110, interfaces 115-150 for signals, an output interface 155 and a clock-pulse generator 160. The control unit 105 further comprises a value memory 165 and a counter 170.

By means of the driver-actuated pushbutton 110, the driver of the motor vehicle communicates his wish to release the parking brake, which is in a partially or fully closed state. A signal representing this wish is transmitted from the pushbutton 110 to the control unit 105. The control unit 105 is connected to the interfaces 115-150, which sample signals that relate to a position of an accelerator pedal (interface 115), a position of a clutch pedal (interface 120), a brake pressure (interface 125), a state of a seat occupancy switch (interface 125), an ignition signal (interface 130), an engaged gear stage (interface 135), a closing signal of a belt lock of a driver's seat (interface 140), and a motion signal of the vehicle (interface 150). In alternative embodiments, a plurality of these interfaces can be omitted, replaced by interfaces to other vehicle devices, or modified.

The signals sampled by the interfaces 115 to 150 can each be stored in a memory location (not shown) in the memory unit 165, for the purpose of subsequent comparison of a value of a signal with a preceding value. For each of the interfaces, the counter 170 comprises a register (not represented) for recording a value representing a predetermined time interval. The registers are decremented in dependence on a clock-pulse signal provided by the clock-pulse generator 160. Clearly, in other embodiments, an incrementing time measurement can also be used.

Further, the control unit 105 is connected to the output interface 155, via which a release command can be transmitted to a control unit 180 assigned to the parking brake (not represented).

Figure 2:
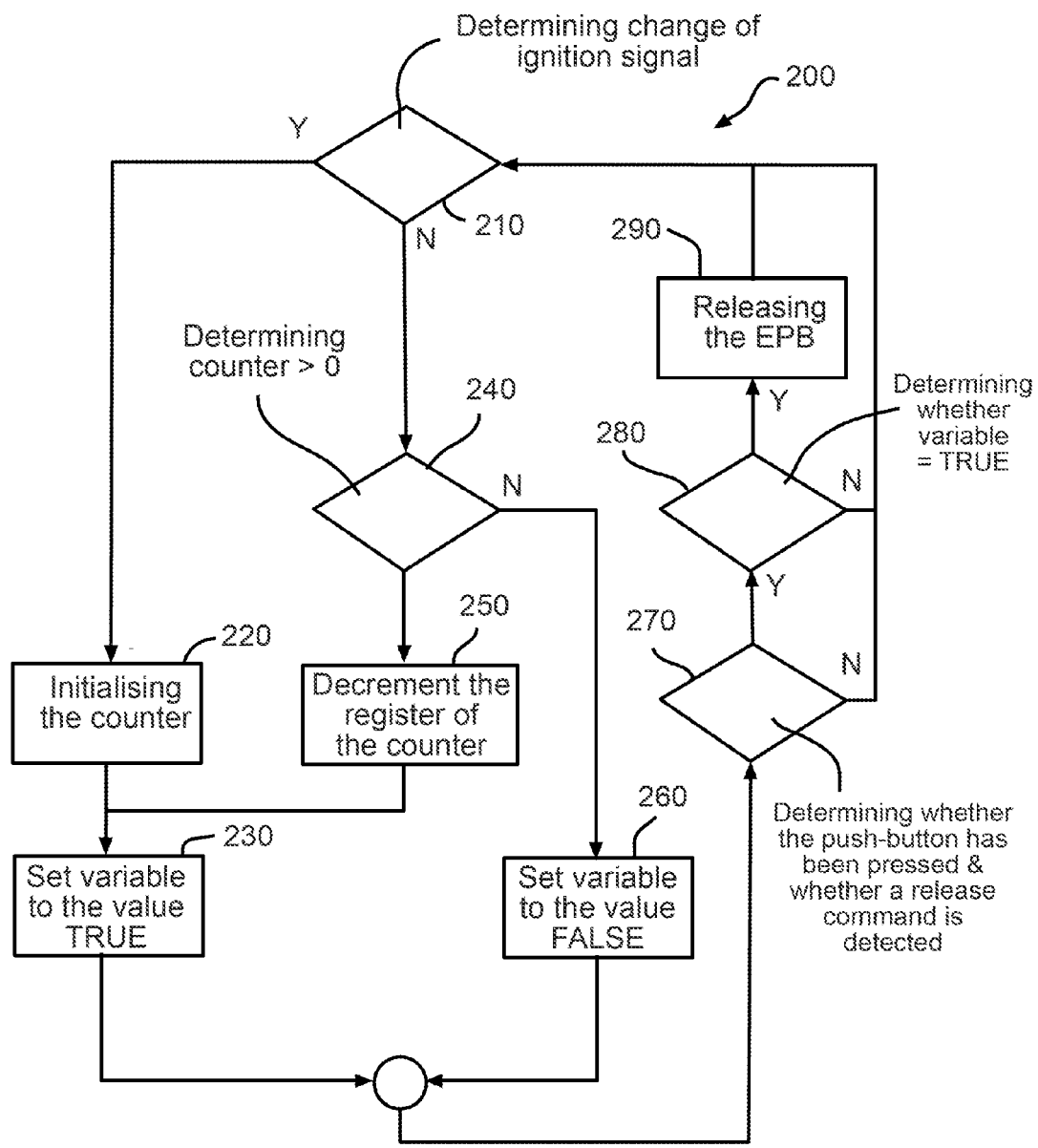
FIG. 2 shows an embodiment of a method, being executed in the device shown in FIG. 1, for releasing a parking brake of a motor vehicle.

FIG. 2 shows an embodiment of a method 200 performed by the device 100 represented in FIG. 1. For clarity, in the following the method is explained with reference only to one of the signals sampled by means of the interfaces 115 to 150, namely, the ignition signal sampled by means of the interface 130.

The method commences in a step 210, in which it is determined whether the ignition signal has changed, in that a value of the ignition signal is compared with a past value stored in the corresponding memory location of the memory 165. If there is yet no value present in the memory location, the comparison is bypassed (not represented) and the value of the ignition signal is considered to be unchanged. The corresponding memory location is then set to the current value of the signal.

If a change is determined in step 210, then, in a step 220, the register of the counter 170 assigned to the interface 130 is initialised with the value 30, which corresponds to a time interval of 3 seconds in the case of the method 200 being performed 10 times per second. Then, in a step 230, a variable, which represents a capacity of the driver to act, is set to the value TRUE.

If, however, in step 210 no change is ascertained in the ignition signal sampled by means of the interface 130, it is checked, in a step 240, whether the corresponding register of the counter 170 contains a value that is greater than zero. If this is the case, in a following step 250 the register is decremented and the method continues with the step 230. Otherwise, the variable representing the capacity of the driver to act is set to FALSE in a step 260.

Following the step 230, or 260, the method continues with a step 270, in which it is determined whether the pushbutton 110 has been pressed and whether a release command is detected. If this is the case, it is determined, in a step 280, whether the variable representing the capacity of the driver to act contains the value TRUE. If this is the case, in a further step 290 the parking brake is released by means of a corresponding signal output on the interface 155 to the control unit 180. If, in step 270, no pressed pushbutton 110 is determined, or if the value of the variable in step 290 is FALSE, there is no signal output on the interface 155 and no release of the parking brake. The method then goes back to the step 210 and begins over again.

As long as no change is determined in the ignition signal sampled by means of the interface 130, the corresponding register of the counter 170 is decremented upon each pass of the method through the step 250, until the register contains the value zero, whereupon a lack of capacity of the driver to act is deduced and release of the parking brake is prevented (the variable has the value FALSE). If, on the other hand, a change in the signal is determined, for the following three seconds existence of a capacity of the driver to act is deduced (the variable has the value TRUE). If, during the course of the three seconds, a further change in one of the signals is detected, the time in which existence of a capacity of the driver to act is assumed is extended by a further three seconds, and so on.

In the case of changes in a plurality of the signals assigned to the interfaces 115 to 150 being taken into account, the above variable is accurately set to TRUE when none of the registers of the counter 170 contains the value zero.

It is therefore possible for release of a parking brake to be refused upon, for example, a release command generated by the driver, if it cannot be assumed that the driver would be able to notice an inadvertent release of the parking brake and to react thereto if necessary. The present invention, without reducing operating comfort for the driver, as compared with known solutions, provides for improved prevention of inadvertent release of the parking brake.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for releasing an electric parking brake of a motor vehicle, comprising the steps of:
   detecting a release command, the release command generated by a driver by actuating a respective input element; and
   releasing the parking brake if a detected change in at least one signal precedes by maximally a predefined time interval, the change indicating capacity of the driver to act;
   wherein the detecting and releasing steps are performed by a control unit.

2. The method according to claim 1, wherein a predefined time interval is respectively assigned to each of a plurality of signals and the method includes the step of releasing the parking brake if a change in at least one of the plurality of signals precedes by maximally the time interval assigned to the signal.

3. The method according to claim 1, wherein the at least one signal is derived from an actuation state of an accelerator pedal, an actuation state of a clutch pedal, a level of a brake pressure of a service brake, a state of a seat occupancy sensor of a driver's seat, an ignition signal, an engaged gear stage, a locking state of a driver's seatbelt, or a vehicle speed.

4. The method according to claim 1, further comprising the step of detecting a change in the signal upon its exceeding or falling below an assigned threshold value.

5. The method according to claim 1, further comprising the step of detecting a change in the signal if a speed of change in the signal is above an assigned threshold value.

6. The method according to claim 1, further comprising the step of determining the expiry of the predefined time interval.

7. The method according to claim 1, further comprising the step of setting a timing element, which signals the elapse of a time interval, to a value corresponding to the predefined time interval.

8. A computer program product having program code means for executing a method according to claim 1 when the computer program product runs on a processing unit, wherein the computer program product is stored on a non-transitory computer-readable data medium.

9. A device for releasing an electric parking brake of a motor vehicle, comprising:
   a first detection device for detecting a release command;
   a second detection device for detecting a change in at least one signal, the change indicating capacity of a driver to act;
   a time measurement device for measuring a predefined time interval; and
   a release device for releasing the parking brake when a detected change in the at least one signal precedes by maximally the predefined time interval, the change indicating capacity of the driver to act.

* * * * *